Oct. 7, 1969 C. BERGER ET AL 3,471,330
BATTERY WITH AN ELECTROLYTE OF SOLID ALKALI PARTICLES
Filed June 14, 1965
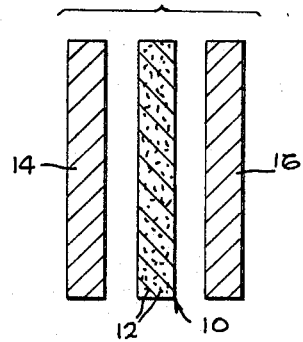
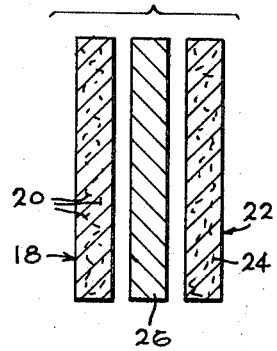
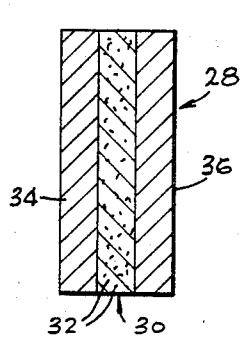
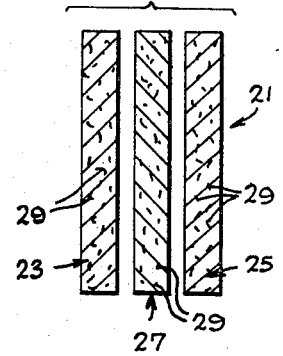
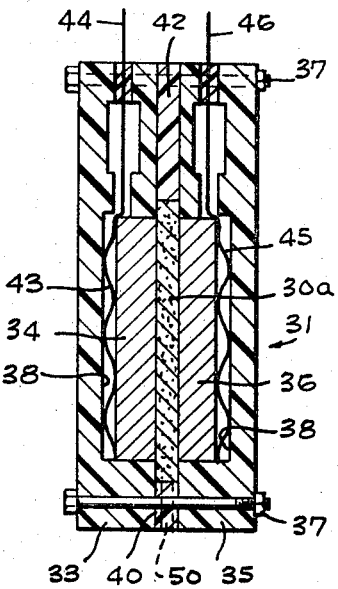
CARL BERGER
FRANK C. ARRANCE
INVENTORS
ATTORNEY United States Patent Office 3,471,330
Patented Oct. 7, 1969

3,471,330
BATTERY WITH AN ELECTROLYTE OF SOLID ALKALI PARTICLES
Carl Berger, Santa Ana, and Frank C. Arrance, Costa Mesa, Calif., assignors to McDonnell Douglas Corporation, Santa Monica, Calif., a corporation of Maryland
Filed June 14, 1965, Ser. No. 463,569
Int. Cl. H01m 35/02, 11/00, 41/02
U.S. Cl. 136—6
9 Claims

ABSTRACT OF THE DISCLOSURE

A battery comprising a pair of electrodes of opposite polarity and an inorganic separator between the electrodes, at least one of the battery components, e.g., the inorganic separator or at least one of the electrodes, containing a dry or solid alkaline substance such as potassium hydroxide, such battery functioning as a thermal battery at an elevated temperature corresponding to the melting point of the solid alkaline material, said electrodes and separator in a preferred embodiment being compressed and sintered into an integral composite unit.

---

This invention relates to batteries, particularly high energy density batteries, and is especially concerned with the provision of improved battery components including separators and electrodes, and improved battery construction incorporating such electrodes and separators. The invention especially relates to the provision of a novel, thermal battery which becomes active at elevated temperature and particularly high temperatures of the order of about 300 to 400° C. and above.

Batteries are an important source of energy storage for power generation in air-borne systems. An important type of battery particularly suited for such applications are the high energy density alkaline electrolyte cells using such electrode combinations as silver-zinc, silver-cadmium and nickel-cadmium. High energy density batteries are generally battery systems which have a substantially higher energy per unit of weight than conventional, e.g., lead storage batteries. Thus, high energy density batteries can develop, e.g., 100 to 140 watt hours of energy per pound. In addition to important air-borne applications, such high energy density batteries have many other applications such as in portable tools and appliances, television, radio and record players, engine starting, portable X-ray units and the like.

In high energy density batteries such as silver-zinc, nickel-cadmium, silver-cadmium, the electrodes are placed adjacent opposite sides of a membrane or separator which performs the function of retaining electrolyte, separating the electrodes, and preventing migration of electrode ions which short circuit the battery. In the copending applications, Ser. No. 379,093, filed June 30, 1964, of Carl Berger et al, and Ser. No. 378,858 filed June 29, 1964, of Carl Berger et al., which is now abandoned, are described improved inorganic separators for this purpose, and which are particularly suited for battery operation at temperatures above 100° C.

For activation of these batteries, the pores of the separator are filled with an aqueous alkaline electrolyte in the form of an aqueous solution of an alkali such as potassium hydroxide. For this purpose it is usually the practice to introduce the aqueous alkaline solution into the battery just at the time that the battery is to be placed in operation. In many air-borne applications, however, it is inconvenient to store aqueous alkaline solutions to be incorporated into these batteries when power is required therefrom.

Thermal batteries which are inactive at ambient temperature up to from about 100 to about 300° C. or higher but which become active at said elevated temperatures, are of value for application in devices where high temperatures are encountered, e.g., in air-borne application. Since weight and volume are important considerations in such application, small light weight compact high energy power sources which are operative at such elevated temperatures are of particular interest.

One object of the invention is to provide improved battery separators and/or battery electrodes, especially designed for high energy density batteries, which have incorporated therein an alkaline material such that when these components are assembled in a battery, the battery can be activated simply by adding water to the battery.

Another object of the invention is to provide an improved battery, particularly a high energy density battery, having the above noted characteristics.

An important object of the invention is to provide novel battery separators and/or battery electrodes, particularly designed for use in high energy density batteries, having incorporated therein an electrolyte material so that when such components are assembled in a battery, a thermal battery is produced which is inactive at ambient temperatures and up to about 300° C. or higher, but which is active at such elevated temperatures and which will operate at temperatures generally ranging from about 300 to about 800° C.

Another object of the invention is the provision of a battery affording a small light weight compact high energy source and which is inactive at ambient temperatures up to an elevated temperature in excess of about 300° C. but is operative at such elevated temperatures, and then becomes inoperative at temperatures below about 300° C.

A still further object of the invention is to provide secondary batteries operable at elevated temperatures in excess of about 300° C. and up to about 800° C. and which are operative over a large number of charge-discharge cycles.

A particularly important object is to provide a durable, high strength composite unitary battery construction, the electrode and separator components of which are held together in secure engagement, and having high temperature resistance, and especially designed as a high energy density battery, e.g., a silver-zinc, silver-cadmium, or nickel-cadmium battery, and which is operable only at elevated temperatures, e.g., above about 300° C., or which is operable at ambient temperatures merely by addition of water to the battery.

Other objects and advantages will appear hereinafter.

The above objects and advantages are achieved according to the invention by incorporating a dry or solid alkaline substance such as an alkali, e.g., potassium hydroxide, into an inorganic battery separator material of the types described hereinafter, and/or into the battery electrode material, such as the zinc and silver electrode materials, for use in a high energy density silver-zinc battery, at the time of processing such battery components. A battery assembled with such components and containing the solid potassium hydroxide or other equivalent alkaline material in the battery separator and/or the battery electrodes, functions as a battery which is inactive at ambient temperature and up to a temperature corresponding to the melting point of the solid alkaline material, e.g., potassium hydroxide, but becomes active above the melting point of such alkaline material. Alternatively, such battery can be made to function at ambient temperature, since such battery also becomes readily activated by introducing water into the battery which dissolves the solid alkaline material, forming the electrolyte solution required to make the battery functional.

The invention will be more readily understood from the description below, taken in connection with the accompanying drawing wherein:

FIG. 1 illustrates the separate battery components according to one embodiment of the invention;

FIG. 2 illustrates the separate battery components according to another embodiment of the invention;

FIG. 3 illustrates a composite separator-electrode battery construction employing the invention principles;

FIG. 3a illustrates the separate battery components according to a further modification; and FIG. 4 shows a battery of the types illustrated in FIGS. 1 to 3, assembled for use within a case.

The showings in the drawings are exaggerated for purposes of greater clarity.

Thus, for example, a battery having the above noted characteristics and which functions as a thermal battery which only becomes active on heating to elevated temperature corresponding to the melting point of the alkaline material, or which is functional at ambient temperature by the addition of water, is prepared by mixing solid potassium hydroxide and inorganic separator material such as aluminosilicate, and the material is pressed together and preferably sintered to form an inorganic separator containing a suitable and preferably substantial proportion of potassium hydroxide. Such a separator, when assembled in a battery with silver and zinc electrodes positioned on opposite sides of the separator, is functional by heating the battery to temperature above the melting point of potassium hydroxide, e.g., above about 360° C, or by adding water to the separator material. The components of such a battery assembly are illustrated in FIG. 1 of the drawing, in which numeral 10 represents the inorganic separator containing solid particles of alkali such as potassium hydroxide dispersed therein, as indicated at 12. Numerals 14 and 16 represent electrodes of the usual type such as zinc and silver electrodes, respectively, which can be assembled in a battery in the manner illustrated in FIG. 4 of the drawing and described hereinafter, with the electrodes disposed in contact with opposite faces of the separator.

Alternatively, solid alkaline material such as potassium hydroxide can be mixed with the respective electrode materials, and the mixture compacted to form one or both of the electrodes of a battery, such as the zinc and/or silver electrode of a silver-zinc high energy density battery; including an inorganic separator, and when a battery is assembled incorporating such electrodes and separator, it becomes active either by introducing water into the porous separator or into the pores of the electrode to form the aqueous alkaline solution rendering the battery operative. This same battery assembly can function as a thermal battery by heating the battery to temperature corresponding to the melting point of KOH, about 360° F., at which temperature and more elevated temperatures the battery is operative. The components of such a battery are illustrated in FIG. 2 of the drawing wherein numeral 18 represents a zinc electrode containing particles of solid alkaline material such as potassium hydroxide, indicated at 20, dispersed therein, numeral 22 represents a silver electrode also having dispersed therein particles of alkaline material such as dry potassium hydroxide, indicated at 24, and 26 is an inorganic separator, e.g., an aluminosilicate separator. These components can be assembled to form a battery as illustrated in FIG. 4 and also described below, with the zinc and silver electrodes 18 and 22 disposed in contact with opposite sides of the separator 26. If desired, it will be understood that only one of the electrodes 18 and 22 need contain the solid alkaline material to render the battery operative either by addition of water thereto or by subjecting the battery to elevated temperature as described above.

According to a preferred embodiment and in accordance with the principles of our copending application Ser. No. 463,607, filed June 14, 1965, now Patent No. 3,379,569, a durable high strength unitary battery can be provided, for example, by mixing solid alkali or alkaline material, e.g., potassium hydroxide, with inorganic separator material such as aluminosilicate, and forming a composite separator-electrode assembly by pressing together the above noted potassium hydroxide-inorganic separator material mixture with electrode material such as silver-silver oxide electrode material on one side of the separator, and zinc oxide electrode material on the other side of the separator, and then sintering the resulting composite, e.g., at temperatures ranging from about 1,000 to about 3,000° F.

Such a composite battery cell is illustrated at 28 in FIG. 3 of the drawing. In this composite battery numeral 30 represents the inorganic separator having distribution therein solid particles of alkaline material such as potassium hydroxide, indicated at 32, with the zinc and silver electrodes 34 and 36 respectively secured in engagement with opposite faces of the separator 30. Such a composite can be assembled to form a battery of the type illustrated in FIG. 4 and also described more fully below.

Because of the composite sintered unitary nature of the separator-electrode assembly illustrated in FIG. 3, the resulting battery is strong and rugged and can be placed in an environment or in equipment which is subject to sudden and large shocks and vibrations and will withstand such rigorous treatment over extended periods of time and even when such batteries are at the same time subjected to elevated temperatures, e.g., of the order of about 100° C. or substantially above this temperature without damage or disintegration, and without adversely affecting the electrical characteristics of the battery.

If desired, and for purposes of providing a particularly rugged battery according to the principles of the above copending application Ser. No. 463,607, filed June 14, 1965, the electrodes, e.g., zinc and silver electrodes illustrated at 34 and 36 in FIG. 3, can be formed from a mixture of electrode material such as zinc oxide and inorganic separator material such as aluminosilicate. The proportions of components of this mixture can range by weight from about 90 parts of electrode material and about 10 parts of inorganic separator material, to about 10 parts of electrode material and about 90 parts of separator material, based on 100 parts by weight of the mixture, as described in detail in our above copending application. Such description is incorporated herein by reference.

In the form of battery produced according to our above copending application Ser. No. 463,607 the solid alkaline material, e.g., KOH, can be incorporated alternatively in the electrodes, with or without incorporation of such solid alkaline material in the separator.

The dry or solid alkaline materials which are incorporated either into the inorganic battery separator or into the electrode as described above, can be any alkaline material which is fusible and preferably also water soluble. Preferred materials of this type are the alkalis potassium hydroxide, sodium hydroxide, lithium hydroxide, and combinations thereof. When utilizing the battery of the invention as a thermal battery, the elevated temperature of activation of the battery will depend upon the particular solid alkaline material employed, due to differences in melting point thereof. Thus, for example, when employing potassium hydroxide such a battery according to the invention becomes operative as a thermal battery at temperatures of about 360° C. and above; when employing lithium hydroxide as alkaline material in a thermal battery, the battery becomes operative at temperatures of about 450° C. and above; and when employing sodium hydroxide as the alkaline material the battery becomes operative at temperatures of about 320° C. and above. These batteries generally operate effectively at a temperature ranging from about 400° up to about 800° C. When temperatures are lowered, e.g. from a temperature of about 500° C., to a point just below the melting point of the alkaline material and such material solidifies, the battery becomes abruptly inoperative. A preferred alkaline material for incorporation into the inorganic battery separator or the electrodes of the battery according to the invention principles is dry potassium hydroxide.

The inorganic separator material which can be used to form the inorganic separator, e.g. member 10, 26 or 30 in FIGS. 1 to 3 above, and which preferably has incorporated therein the dry alkaline material, e.g. KOH, according to the invention, can include a variety of inorganic substances. Thus, for example, suitable inorganic separator materials include insoluble hydrous metal oxides such as the hydrous oxides of zirconium, titanium, antimony, tungsten, silicon, scandium, bismuth, vanadium, aluminum and cerium. The term "insoluble hydrous metal oxides" includes those water insoluble materials containing one or more metal atoms, oxygen atoms, and an indeterminate quantity of water. The hydrous metal oxides do not necessarily have a definite stoichiometric combination or definite crystal structure and may contain ionic impurities. Such hydrous metal oxide separator materials and their method of preparation are described in the copending application Ser. No. 379,093 filed June 30, 1964, of Carl Berger et al. A preferred separator of this type is hydrous zirconium oxide or zirconia.

Other porous inorganic materials which can be employed for producing the separator according to the invention include the aluminosilicates, particularly the alkali metal and alkaline earth metal aluminosilicates, alumina and silica, particularly because of their formation of a hard ceramic material upon sintering, while still retaining porous characteristics. The aluminosilicates are particularly preferred in this respect because such aluminosilicates have lower internal resistance as compared for example to alumina or silica. Examples of such aluminosilicates include aluminosilicate, sodium and potassium aluminosilicates, and magnesium, calcium, barium and strontium aluminosilicates. These materials can be used separately, but often mixtures of these aluminosilicates are used e.g. complex mixtures of both the alkali metal and alkaline earth metal aluminosilicates. Such inorganic separator materials are described in the above mentioned copending U.S. application Ser. No. 378,858.

Other types of silicates can also be employed as inorganic separator materials alone or together with the other separator materials noted above. Thus, for example, zircon (zirconium silicate) can be used, and talc (magnesium silicate) can be used alone or as fluxing material.

Another useful class of inorganic separator materials are the naturally occurring clay minerals of the kaolinite group. This is a group of naturally occurring clays containing aluminum oxide and silica usually together with bound water, and having the formula $Al_2O_3 \cdot 2SiO_2 \cdot 2H_2O$. In addition to kaolinite, other useful members of this group include the mineral clays, halloysite, dickite, nacrite and anauxite.

All of the above inorganic separator materials provides a porous separator when formed into a thin layer by compaction and sintering.

A relatively broad range of proportions of alkaline material e.g. potassium hydroxide, can be incorporated in the inorganic separator material for producing the inorganic separator containing the particles of dry alkaline material distributed therein according to the invention. Thus, for example, from about 10 parts of alkaline material such as potassium hydroxide and about 90 parts of inorganic separator material, to about 60 parts of alkaline material and about 40 parts of inorganic separator material, based on 100 parts by weight of the mixture, can be employed. Generally, it is preferred to employ sufficient alkali to obtain good conductivity and sufficient separator material to provide a continuous barrier against passage of electrode ions through the separator. It has been found from experience that a proportion for example of about equal parts by weight of solid alkaline material such as potassium hydroxide and said inorganic separator material such as aluminosilicate, give excellent results.

The inorganic battery separators having the solid particles of alkaline material or alkali distributed therein according to the invention are preferably sintered, e.g. from about 1,000 to about 3,000° F.

Where the dry alkaline material e.g. potassium hydroxide, is incorporated in the electrode material such as silver and/or zinc electrode materials, the proportions of alkaline material employed also can vary over a broad range. Thus, for example, from about 5 parts of alkaline material such as potassium hydroxide and about 95 parts of electrode material such as silver or zinc electrode material, to about 95 parts of alkaline material and about 5 parts of electrode material, based on 100 parts by weight of the mixture, can be employed. These proportions of incorporated alkaline material also apply to cadmium and nickel electrode materials. In preferred practice the amount of electrode material present in this mixture ranges from about 60 to about 80 percent by weight of the mixture, and the amount of alkaline material from about 20 to about 40% by weight.

The battery electrodes having the solid particles of alkaline material or alkali distributed therein according to the invention are compacted, and in preferred practice when forming a composite battery according to the invention, the electrodes can also be sintered, e.g. at temperatures from about 1,000 to about 3,000° F. However, such sintering of the electrodes when produced as separate battery components, is not necessary.

In the high energy density battery according to the invention in which the inorganic separator contains the dry or solid alkaline material such as potassium hydroxide, as illustrated in FIG. 1, generally the battery is activated more rapidly than in the case where the alkaline material e.g. potassium hydroxide, is contained in the electrode or electrodes, as illustrated in FIG. 2. The reason for this is that in the latter case, it is necessary for the potassium hydroxide electrolyte either in aqueous solution when water is added, or in fused form when the battery functions as a thermal battery at high temperatures, to diffuse from the electrodes and to become uniformly dispersed throughout the separator 26, which is required for electrolyte ion transport between the electrodes.

As previously noted, according to the invention the inorganic separator can contain dry alkaline material such as the inorganic separator in FIG. 1, and also one or more of the electrodes can contain the dry alkaline material as illustrated by electrodes 18 and 22 in FIG. 2. Such a combination wherein both the separator and the electrode or electrodes includes the dry alkaline material, is particularly preferred where it is desired to obtain rapid activation of the battery. Such a combination is illustrated at 21 in FIG. 3a of the drawing, in which 23 and 25 are electrodes, e.g. zinc and silver electrodes, and 27 is an inorganic separator, all of which have particles of solid alkaline material, e.g. KOH distributed therein, as indicated at 29. If desired, the KOH can be present in only one of the electrodes 23 and 25, and omitted from the other. Such a combination of components, when assembled in a battery e.g. as illustrated in FIG. 4, is activated more rapidly, for example, than the battery formed from the components illustrated in FIG. 1 wherein only the separator contains the alkaline material, and also more rapidly than the battery formed from the components illustrated in FIG. 2, wherein only the electrodes contain particles of solid alkaline material.

During discharge of the batteries illustrated in FIGS. 1 to 3a, as is well known, the zinc is converted to zinc oxide and the silver oxide to silver, and during charging of such batteries the silver is oxidized to silver oxides and the zinc oxide is reduced to zinc. Because of these reversible reactions, the terms "silver" and "zinc," the terms "silver" and "cadmium" and the terms "nickel" and "cadmium," referring to the metals forming the respective electrodes of such battery systems, are intended to denote either the respective metals themselves or the corresponding oxides thereof.

The following are examples of practice of the invention, all parts being expressed in terms of parts by weight unless otherwise indicated.

Example 1

About 27 parts zinc oxide, 1.35 parts mercuric oxide and 1.5 parts polyvinyl alcohol are mixed in a vibratory mixed. The resulting zinc electrode mixture is placed in a pressing die in amounts sufficient to form an electrode compact of about 0.020 inch thick, and the layer is compacted at moderate pressure.

Over this initial layer of electrode material is placed a layer of a mixture of 50 parts of solid KOH and 50 parts of an aluminosilicate separator material in the form of a mixture of sodium and potassium aluminosilicate and calcium, magnesium and barium aluminosilicates. This mixture is ground in a mortar until it passes a 325 mesh screen, the amount of such mixture employed being such as to form a layer of separator material of about 0.035 inch thick. This second layer is then moderately compacted.

A silver electrode material is prepared by mixing together 15 parts of silver and 15 parts of silver oxide. The resulting mixture is then placed as a third layer in the die over the second layer of inorganic separator material containing KOH, and this silver electrode layer is then also moderately compacted.

The die containing this battery assembly is then placed in a hydraulic press and compacted at 20 tons total load. The compacted composite unit is then sintered for about ½ hour at 1800° F. in an electric furnace while covered with an inverted crucible to provide a neutral atmosphere. After cooling, a composite battery unit of the type illustrated in FIG. 3 of the drawing is produced.

The resulting composite so produced is assembled to form a battery as shown in FIG. 4 of the drawing, employing, for example, a fused ceramic, or ceramic on metal case 31 formed of two symmetrical half portions 33 and 35 which are bolted together as indicated at 37. Compartments 33 and 35 of the case have recesses 38 formed therein to receive the zinc and silver electrodes 34 and 36 respectively, of the composite battery unit described above. The inorganic separator 30a including KOH, of the battery composite is disposed centrally between the case portion 33 and 35 and extending for a short distance at the top and bottom so as to be disposed and held in position between the half portion 33 and 35 of the case. Spacers 40 and 42 e.g. also formed of fused ceramic, are provided about the periphery of separator 38, to form a seal. Stainless steel screens 43 and 45 of about 100 mesh, are positioned in the space between the electrodes 34 and 36 and the adjacent side walls of the case, and are urged against the electrodes 34 and 36. The stainless steel screens 43 and 45 are thus clamped against the electrodes 34 and 36 to insure good electrical contact with the electrode surfaces. Silver terminal wires 44 and 46 are connected respectively to the screens 43 and 45, and are brought through the ceramic, electrode-retaining sections at the top of the assembly as shown.

The wires 44 and 46 are attached to a constant current power source which could provide 50 ma. (milliamps) current. No current passed at room temperature. The assembly is then heated. As the assembly heats up and increases in temperature the current commences to flow at about 360° C., and rises in a few minutes to 50 ma. The cell is then charged for 30 minutes at a 50 ma. rate. Charging current is removed and an open circuit voltage of 1.85 is noted, which falls to about 1.6 volts in a few minutes, where it thereafter remains approximately constant.

The cell is then discharged for 5 mintues at 2 ma. Voltage falls to 1.4 volts. The cell is charged and discharged in this fashion for 5 cycles. The operating temperature of this battery cell ranges from about 400 to about 500° C.

When the heat source is removed the current continues to flow until the KOH solidifies (at about 360° C.), at which point the current stops flowing abruptly. On reheating the cell, the current build-up is gradual as progressive melting takes place above about 360° C. The cell functions as a secondary battery accepting charge and discharge over a repeated number of cycles.

The battery described above and illustrated in FIG. 4 can be made to function at ambient temperature by introducing water into the separator 30a containing KOH, via an opening in the spacer 40, as indicated by dotted lines at 50.

The battery described above and illustrated in FIG. 4 is a hard rugged unit which can be subjected to sudden shocks and continued vibration for periods of time without damage, even at highly elevated temperatures.

Example 2

The procedure of Example 1 is substantially followed for producing a composite assembly of zinc and silver electrodes and aluminosilicate separator, except that the KOH is not incorporated into the separator but rather into each of the zinc and silver selectrode mixtures.

Thus, in the mixture forming the zinc electrode material in the procedure of Example 1, there is incorporated solid KOH in an amount of about 30% by weight of the total zinc electrode mixture. Also, in the silver electrode material prepared according to the procedure of Example 1, solid KOH is incorporated in an amount of about 30% by weight of the total silver electrode mixture.

The resulting composite battery unit is assembled to form a battery as shown in FIG. 4 of the drawing. When employing such a battery as a thermal battery, such battery is activated somewhat slower than the thermal battery of Example 1 containing solid KOH in the aluminosilicate separator. When employing such a battery at ambient temperature by introducing water into the battery in the manner described above and illustrated in FIG. 4, the battery is also activated somewhat more slowly than the battery described in Example 1.

The battery in this example otherwise has similar electrical characteristics to the battery described above in Example 1.

Example 3

A composite battery unit according to the invention as described in Example 1, is prepared by procedure as described in Example 1 except that in place of employing an aluminosilicate for preparing the separator, such separator is formed of kaolinite, and 40 parts of solid sodium hydroxide is mixed with 60 parts by weight of the kaolinite to form the layer of inorganic material placed between the layers of zinc and silver electrode materials in forming the composite.

The resulting battery is assembled in the manner described in Example 1 and illustrated in FIG. 4. When such a battery is employed as a thermal battery, the battery remains inactive up to about 320° C. at which temperature current commences to flow as the sodium hydroxide melts and such battery functions effectively as a thermal battery between about 320 and about 600° C. Such battery functions similarly to the battery of FIG. 1 at ambient temperature by incorporation of water to form a sodium hydroxide solution. Such battery has electrical characteristics otherwise similar to those of the battery of Example 1.

Example 4

A battery unit according to the invention is provided by procedure described substantially in Example 1 except that instead of employing a zinc electrode mixture, about 30 parts by weight of cadmium oxide powder is employed, and also the intermediate inorganic separator layer is composed of a mixture of 70 parts of zirconia and 30 parts of solid lithium hydroxide, in place of the aluminosilicate mixture containing potassium hydroxide employed in Example 1.

The resulting composite battery unit is a silver-cadmium battery according to the invention, employing a zirconia type separator including LiOH. The resulting silver-cadmium battery when assembled in the manner described above and shown in FIG. 4, provides a rugged battery that can function as a thermal battery which remains inactive up to a temperature of about 450° C. at which point the lithium hydroxide melts and the battery becomes activated. Such a battery functions effectively as a thermal battery at temperatures between about 450 and about 800° C. Alternatively, such battery can be activated by introduction of water as illustrated in FIG. 4 to form a lithium hydroxide electrolyte solution.

Example 5

A mixture of 40 parts of solid KOH and 60 parts of an aluminosilicate separator material in the form of a mixture of sodium and potassium aluminosilicate and calcium, magnesium and barium aluminosilicates, is granulated. Such granulated material is pressed in a die at a pressure of about 5,000 p.s.i., and the pressed separators in the from of discs are then sintered by heating to about 1,000 to about 1,500° F. for a period of about 2 hours. The sintered aluminosilicate separator containing KOH thus formed has a thickness of about 0.030 inch.

Silver electrode material is prepared employing equal parts of silver and silver oxide. These materials are mixed in a high speed vibrating mixture and pressed at about 10 tons total load into thin discs.

Zinc electrodes are prepared by mixing about 90 parts zinc oxide, 7 parts mercuric oxide and 3 parts of polyvinyl alcohol in a high speed vibrating mixer, and compressed discs of this material are formed.

Thus, there are produced three separate components, namely the zinc and silver electrodes illustrated at 14 and 16 in FIG. 1 and the aluminosilicate separator containing solid KOH, illustrated at 10 in FIG. 1.

The separator and electrodes described above are assembled to form a battery as illustrated in FIG. 4. Such a battery can function as a thermal battery as in the case of the battery described in Example 1, or functions by introduction of water as described in Example 1 and illustrated in FIG. 4. Such a battery also has electrical characteristics similar to the battery of Example 1. However, the battery of this example, formed of separate separator and separate electrode components, is not as strong or as rugged as the composite battery described in Example 1, wherein the electrode and separator components are fabricated and sintered together as a single unit.

Example 6

A battery is produced by procedure similar to that described in Example 5 except that in the silver electrode material there is incorporated 25% of solid KOH by weight of the mixture, and in the zinc electrode mixture there is also incorporated 25% of solid KOH by weight of such mixture. Further, potassium hydroxide is omitted from the aluminosilicate separator material.

There is thus produced three separate battery components in the form of zinc and silver electrodes each containing solid potassium hydroxide, as illustrated at 18 and 22 in FIG. 2 of the drawing, and an aluminosilicate separator as illustrated at 26 in FIG. 2.

The separator and electrodes described above are assembled to form a battery as illustrated in FIG. 4 of the drawing. Such a battery can function as a thermal battery in the manner described in Example 1, and also can function at ambient temperature by incorporation of water therein as described in Example 1 and illustrated in FIG. 4. Such a battery has electrical characteristics similar to the battery described in Example 2 but is not as strong and rugged as the composite unitary battery of Example 2, in which the zinc and silver electrodes each containing potassium hydroxide, are securely bonded to the aluminosilicate separator.

Example 7

A battery is produced by procedure similar to that described in Example 5 except that in the silver electrode material there is incorporated 25% of solid KOH by weight of the mixture, and in the zinc electrode mixture there is also incorporated 25% of solid KOH by weight of such mixture.

There is thus produced three separate battery components in the form of zinc and silver electrodes and separator, each containing potassium hydroxide, as illustrated at 23, 25 and 27 in FIG. 3a of the drawing.

The separator and electrodes described above are assembled to form a battery as illustrated in FIG. 4 of the drawing. Such a battery can function as a thermal battery in the manner described in Example 1, and also can function at ambient temperature by incorporation of water therein as described in Example 1 and illustrated in FIG. 4. The battery of this example is activated more rapidly than the battery of Example 5 or Example 6, due to the presence of KOH in the separator and also in the electrodes.

Example 8

A battery is produced similar to that described in Example 2 above except that in the aluminosilicate separator mtaerial there is also incorporated 15% solid KOH by weight of the separator mixture.

The resulting composite battery thus contains solid KOH in both the zinc and silver electrodes and also in the aluminosilicate separator. The resulting battery assembled in the manner illustrated in FIG. 4 of the drawing functions as a thermal battery at elevated temperature, and also at ambient temperature by introduction of water, similarly to the battery of Example 2, and has electrical properties also similar thereto. However, the battery of this example is activated more rapidly either when functioning as a thermal battery at elevated temperature, or by introduction of water at ambient temperature, due to the presence of the KOH in the separator and also in the electrodes.

Example 9

A battery composite is produced by the procedure substantially described in Example 1 to provide a battery as ilustrated in FIG. 4, except that in place of the zinc and silver electrode materials of Example 1, cadmium and nickel electrode materials are employed. Thus, the first layer of material provided as described in the procedure of Example 1 is composed of a mixture of about 30 parts of powdered cadmium oxide and about 30 parts of an aluminosilicate, and the top layer is composed of a mixture of about 30 parts of green nickel hydroxide and about 30 parts of an aluminosilicate, the intermediate separator layer being composed of the aluminosilicate and solid KOH mixture in substantially equal weight proportions.

The resulting sintered composite unit when assembled in a battery as described in Example 1 and illustrated in FIG. 4, forms a very rugged durable battery which functions as a thermal battery at elevated temperature, or which functions at ambient temperature by introduction of water, similarly to the battery of Example 1.

It will be understood that the high energy density batteries of the invention can be employed both as primary or secondary batteries. Because of the resistance to high temperatures of the battery of the invention, such batteries can be heat sterilized without damage to electrodes or separator.

It will be understood from the above that the principles of the invention can be employed for production of any type of high energy density battery system, including silver-zinc, silver-cadmium, nickel-cadmium, and the like.

From the foregoing, it is seen that the invention provides novel electrode and separator components especially designed for high energy density batteries, one or more of which can contain a solid alkaline material, e.g., solid KOH, preferably distributed in particulate form in said components, so that when these components are assembled in a high energy density battery, it maintains its physical integrity at high temperatures, and can function effectively as a thermal battery which is inactive at ambient temperatures and at temperatures up to in excess of about 300° C., but which can operate from temperatures somewhat in excess of 300° up to about 800° C. Also, such battery can be placed in operation effectively at ambient temperature by introduction of water into the battery to form the activating electrolyte. Moreover, and of particular importance, such battery can be fabricated into the form of a single composite unit according to our copending application Ser. No. 463,607 to produce a rugged, shock resistant battery which will withstand severe shocks and rough handling, yet remain operative.

While we have described particular embodiments of the invention for purposes of illustration it will be understood that various changes and modifications can be made within the spirit of the invention, and the invention accordingly is not to be taken as limited except by the scope of the appended claims.

We claim:

1. A battery consisting essentially of the components, a pair of electrodes of opposite polarity and an inorganic separator between said electrodes for retaining electrolyte and permitting transfer of electrolyte ions, at least one of said components having distributed therein solid particles of an alkali selected from the group consisting of potassium hydroxide, sodium hydroxide, lithium hydroxide, and mixtures thereof, said electrodes and separator being compressed and sintered into an integral composite unit.

2. A battery as defined in claim 1, wherein said alkali is present in said separator.

3. A high energy density battery consisting essentially of a pair of electrodes of opposite polarity and a porous inorganic separator between said electrodes for retaining electrolyte and permitting transfer of electrolyte ions, said inorganic separator being composed of a material selected from the group consisting of insoluble hydrous metal oxides, aluminosilicates, alumina, silica, zircon and talc, said separator having distributed therein solid particles of an alkali selected from the group consisting of potassium hydroxide, sodium hydroxide, lithium hydroxide, and mixtures thereof, in an amount from about 10 parts of said alkali and about 90 parts of said inorganic separator material, to about 60 parts of said alkali and about 40 parts of said inorganic separator material, based on 100 parts by weight of the mixture, said electrodes and separator being compressed and sintered into an integral composite unit.

4. A high energy density battery consisting essentially of a pair of electrodes of opposite polarity and a porous inorganic separator between said electrodes for retaining electrolyte and permitting transfer of electrolyte ions, said electrodes being composed of an electrode material selected from the group consisting of silver, zinc, cadmium and nickel electrode materials, at least one of said electrodes having distributed therein solid particles of an alkali selected from the group consisting of potassium hydroxide, sodium hydroxide, lithium hydroxide, and mixtures thereof in an amount from about 5 parts of said alkali and about 95 parts of said electrode material, to about 95 parts of said alkali and about 5 parts of said electrode material, based on 100 parts by weight of the mixture, said electrodes and separator being compressed and sintered into an integral composite unit.

5. A battery which comprises zinc and silver electrodes and an aluminosilicate separator, said zinc and silver electrodes being mounted on opposite sides of said separator, said separator having distributed therein solid particles of an alkali selected from the group consisting of potassium hydroxide, sodium hydroxide, lithium hydroxide, and mixtures thereof in an amount from about 10 parts of said alkali and about 90 parts of said inorganic separator material, to about 60 parts of said alkali and about 40 parts of said inorganic separator material, based on 100 parts by weight of the mixture, said electrodes and separator being compressed and sintered into an integral composite unit.

6. A battery as defined in claim 5, wherein said alkali is potassium hydroxide.

7. A battery as defined in claim 6, wherein said zinc and silver electrodes each have distributed therein solid particles of potassium hydroxide.

8. A battery which comprises zinc and silver electrodes and an aluminosilicate separator, said zinc and silver electrodes being integrally mounted on opposite sides of said separator, said separator having distributed therein solid particles of potassium hydroxide in approximately equal proportions by weight, and said electrodes and separator being compressed and sintered into an integral composite unit.

9. A battery which comprises zinc and silver electrodes and an aluminosilicate separator, said zinc and silver electrodes being integrally mounted on opposite sides of said separator, said electrodes each having distributed therein solid particles of potassium hydroxide in an amount such that the electrode material is present in an amount from about 60 to about 80% by weight of the mixture, and said electrodes and separator being compressed and sintered into an integral composite unit.

References Cited

UNITED STATES PATENTS

| | | |
|---|---|---|
| 856,162 | 6/1907 | Kitsee. |
| 3,026,364 | 3/1962 | Jackson et al. _____ 136—153 X |
| 3,050,576 | 8/1962 | Comanor _____ 136—6 |
| 3,116,173 | 12/1963 | Raper. |
| 3,201,278 | 8/1965 | Kurtzweil et al ____ 136—133 X |
| 3,216,911 | 11/1965 | Kronenberg _____ 136—86 X |
| 3,245,836 | 4/1966 | Agruss _____ 136—83 |
| 3,258,365 | 6/1966 | Klopp et al. _____ 136——137 X |
| 3,266,940 | 8/1966 | Caesar _____ 136—86 |
| 3,300,344 | 1/1967 | Bray et al. _____ 136—86 |
| 2,077,561 | 4/1937 | Heise. |

FOREIGN PATENTS

| | | |
|---|---|---|
| 1,282,491 | 12/1961 | France. |

WINSTON A. DOUGLAS, Primary Examiner

D. L. WALTON, Assistant Examiner

U.S. Cl. X.R.

136—153